(12) United States Patent
Minaz

(10) Patent No.: US 12,236,333 B2
(45) Date of Patent: *Feb. 25, 2025

(54) METHOD AND ARRANGEMENT FOR PREDICTING ENGINE OUT NITROGEN OXIDES (EONOX) USING A NEURAL NETWORK

(71) Applicant: International Engine Intellectual Property Company, LLC, Lisle, IL (US)

(72) Inventor: Askin Minaz, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 972 days.

This patent is subject to a terminal disclaimer.

(21) Appl. No.: 17/245,626

(22) Filed: Apr. 30, 2021

(65) Prior Publication Data

US 2022/0351022 A1  Nov. 3, 2022

(51) Int. Cl.
| | |
|---|---|
| G06F 17/00 | (2019.01) |
| G06N 3/045 | (2023.01) |
| G06N 3/048 | (2023.01) |
| G06N 3/08 | (2023.01) |

(52) U.S. Cl.
CPC ............ *G06N 3/045* (2023.01); *G06N 3/048* (2023.01); *G06N 3/08* (2013.01)

(58) Field of Classification Search
CPC .......... G06N 3/045; G06N 3/048; G06N 3/08; G06N 3/0985; G06Q 10/20; G06F 18/214; G06F 18/2413

USPC .......................................................... 706/21
See application file for complete search history.

(56) References Cited

U.S. PATENT DOCUMENTS

| | | | | |
|---|---|---|---|---|
| 2011/0214650 A1* | 9/2011 | Wang | ................. | F02D 41/1405 |
| | | | | 123/703 |
| 2015/0275733 A1* | 10/2015 | Matsumoto | ........... | F01N 3/2066 |
| | | | | 60/277 |
| 2017/0191862 A1* | 7/2017 | Gonzaga | ................ | E21B 47/001 |
| 2018/0179969 A1* | 6/2018 | Lahti | ...................... | F02M 26/47 |
| 2019/0331044 A1* | 10/2019 | Minaz | ................. | F02D 41/1401 |
| 2020/0065712 A1* | 2/2020 | Wang | ..................... | G06N 20/20 |
| 2021/0287135 A1* | 9/2021 | Shiono | .................... | G07C 5/008 |

* cited by examiner

*Primary Examiner* — Jason T Edwards

(74) *Attorney, Agent, or Firm* — Jack D. Nimz; Umang Khanna

(57) ABSTRACT

The Method and Arrangement for Predicting Engine Out Nitrogen Oxides (EONOx) includes training multiple candidate Artificial Neural Network (ANN) architectures using training data, and then selecting an ANN architecture from the candidates using an automated ANN architecture selection algorithm and testing data. An intelligent EONOx prediction or estimation system using the selected ANN architecture then provides an EONOx output variable, which is used along with the output of an EONOx sensor. The system is deployed into the engine controller. The training and testing sets of data include input variables from engine sensors and/or actuators that relate to EONOx, and may be acquired by testing a target engine. Selecting the optimal ANN architecture may be based on Root Mean Squared Error (RMSE) analysis using the automated ANN architecture algorithm and the training set of data.

20 Claims, 8 Drawing Sheets

METHOD AND ARRANGEMENT FOR PREDICTING ENGINE OUT NITROGEN OXIDES (EONOX) USING A NEURAL NETWORK

BACKGROUND

This disclosure relates to engines, and in particular to engines for commercial ground vehicles, in which an Artificial Neural Network (ANN) connected to engine sensors and actuators is used to intelligently predict Engine Out Nitrogen Oxides (EONOx) in exhaust, and which can be used to replace or supplement EONOx sensor measurement.

RELATED ART

Air quality around the world is deteriorating because of greenhouse gas and other harmful emissions from various sources. Among these sources, the transportation sector plays a pivotal role. In particular, vehicles equipped with diesel engines, such as straight trucks, highway tractors, busses, recreational vehicles, fire trucks, agricultural vehicles, locomotives and other rail vehicles, and ships, contribute to net greenhouse gas and other harmful emissions. Generally, diesel engines are extensively used in commercial and heavy duty vehicles, rather than gasoline or other Otto-cycle engines, because of their greater torque, ruggedness, and higher fuel efficiencies. However, diesel engines have certain limitations such as lower specific power, higher Nitrous Oxides (NOX) emissions, and higher Particulate Matter (PM) emissions.

Increasingly strict emission laws and customer demands for reduced fuel consumption has led to the development of various diesel engine technologies such as Exhaust Gas Recirculation (EGR), Variable Geometry Turbochargers (VGT), and Selective Catalytic Reduction (SCR) in order to meet these demands. VGTs are used to more controllably increase specific engine power through selectively boosting the pressure of intake air. EGR, on the other hand, reduces NOX emissions, but sometimes at the expense of engine efficiency. Furthermore, if the EGR rate is high, the result may be an increase in PM emissions. SCR uses a urea reductant introduced into the exhaust flow in the presence of a catalyst, in order to convert NOX into nitrogen and water.

The manufacture and use of cleaner internal combustion engines, including both diesel engines and Otto-cycle engines, has thus become a common goal for automotive and heavy vehicle researchers and Original Equipment Manufacturers (OEMs). With regards to minimizing greenhouse gas and other harmful exhaust emissions, providing accurate EONOx information to engine and/or aftertreatment control systems is a very important part of exhaust emissions control. Further, certain vehicle On-Board Diagnostics (OBD) monitors require reporting variables such as EONOx slow response and SCR conversion efficiency. In order to provide EONOx information to engine and/or aftertreatment control systems, it is known to provide an EONOx sensor in the exhaust flow upstream from the Diesel Oxidation Catalyst (DOC).

Such EONOx sensors are known to be unreliable. The exhaust environment in which an EONOx sensor must function is high in temperature and contains particulate matter. EONOx sensors are therefore calibrated for these high temperatures and do not produce reliable data before the exhaust is sufficiently warm, around 150 degrees Celsius. Additionally, due to the extreme conditions, EONOx sensors often simply fail. Even when an EONOx sensor is functional, any rapid changes in exhaust conditions, such as changes in flow or oxygen content, can result in the sensor providing data that is not stable or "trustable." This may happen under certain vehicle dynamic situations such as driver demanded torque rising rapidly. In this situation, engine and/or aftertreatment control systems may be configured to use estimated EONOx information instead.

In order to compensate for EONOx unreliability and instability, it is known to estimate EONOx. This may be accomplished using table based EONOx estimation. This approach is often sufficient under steady-state exhaust conditions, but does not work well during dynamic exhaust conditions. Alternately, it is known to estimate EONOx by way of simulation of actual physical conditions using complex software. However, such methods require very complex software strategies and/or tremendous calibration effort. The lack of reliable EONOx information as provided by EONOx sensors results in difficulties in EONOx control and with OBD monitors. Current EONOx sensor technology as used hi heavy and medium duty vehicles, therefore, is limited in its capacity to resolve this problem.

Accordingly, there is an unmet need for an arrangement and method for intelligently estimating and/or predicting EONOx information, in conjunction with, or in lieu of EONOx sensor provided information.

SUMMARY

According to one embodiment of the Method and Arrangement for Predicting EONOx using a Neural Network, an engine has an engine controller and an exhaust gas sensor. An intelligent exhaust gas prediction or estimation system is configured to provide an exhaust gas output variable instead of and/or in conjunction with the exhaust gas sensor. The intelligent exhaust gas prediction or estimation system includes an Artificial Neural Network (ANN) deployed into the engine controller. The ANN has an ANN architecture selected from multiple candidate ANN architectures. Each of the multiple candidate ANN architectures are trained using a training set of data. The selected ANN architecture is selected by way of an automated ANN architecture selection algorithm using a testing set of data.

According to another embodiment of the Method and Arrangement for Predicting EONOx using a Neural Network, a method includes several steps. The first step is providing an engine with an engine controller and an exhaust gas sensor. The second step is training multiple candidate ANN architectures using a training set of data. The third step is selecting an ANN architecture from the multiple candidate ANN architectures by way of an automated ANN architecture selection algorithm using a testing set of data. The fourth step is configuring an intelligent exhaust gas prediction or estimation system to provide an exhaust gas output variable instead of and/or in conjunction with the exhaust gas sensor using the selected ANN architecture. The fifth step is deploying the intelligent exhaust gas prediction or estimation system including the selected ANN architecture into the engine controller.

DETAILED DESCRIPTION

Figure 1:
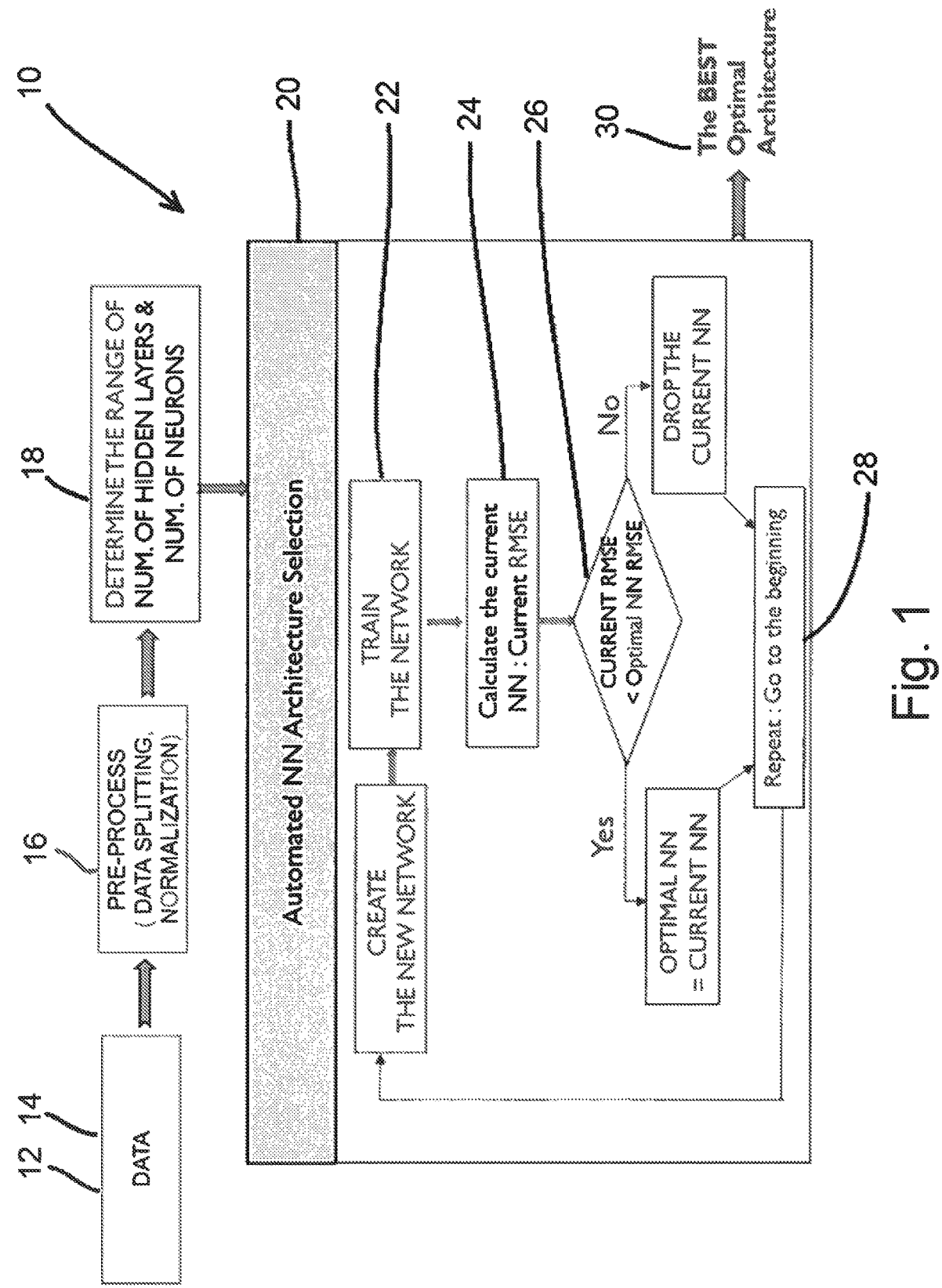
FIG. 1 is a schematic representation of an automated neural network training and selection algorithm of an embodiment of the Method and Arrangement for Predicting EONOx using a Neural Network of the present disclosure, as described herein.

Embodiments described herein relate to a Method and Arrangement for Predicting EONOx using a Neural Network, which may be embodied as both a method and an arrangement. The method and arrangement may be applied to various types of stationary applications, marine applications, passenger vehicles, commercial vehicles, and recreational vehicles, such as highway or semi-tractors, straight trucks, busses, fire trucks, agricultural vehicles, motorhomes, rail travelling vehicles, and etcetera. It is further contemplated that embodiments of the Method and Arrangement for Predicting EONOx using a Neural Network may be applied to engines configured for various fuels, such as gasoline, diesel, propane, natural gas, and hydrogen, as non-limiting examples. The several embodiments of the Method and Arrangement for Predicting EONOx using a Neural Network presented herein are employed on vehicles utilizing the Diesel cycle, but this is not to be construed as limiting the scope of the method and arrangement, which may be applied to engines of differing construction.

The method and arrangement of the present disclosure includes an intelligent EONOx prediction system that uses ANN machine learning methodology to replace and/or supplement EONOx sensor measurements in heavy and medium duty diesel engines. Similarly, the present disclosure contemplates the use of ANN machine learning methodology to replace and/or supplement O2 sensor measurements in gasoline engines. This is accomplished by way of ANN machine learning methodology, in order to avoid relying upon unreliable and/or unstable EONOx and/or O2 sensors. The ANN machine learning methodology eliminates the process of complex software design development and lengthy calibration development. In this way, the Method and Arrangement for Predicting EONOx using a Neural Network makes EONOx controls, OBD monitors, and other emissions control devices more robust.

ANNs have been widely used in a variety of engineering research and, further, they are known to learn underlying highly non-linear relationships. An ANN is a network or circuit composed of artificial neurons or nodes that uses a mathematical or computational model for information processing based on a connectionistic approach to computation. In most cases an ANN is an adaptive system that changes its structure based on external or internal information that flows through the network. The connections of the neurons are modeled as weights. A positive weight reflects an excitatory connection, while negative values mean inhibitory connections. All inputs are modified by a weight and summed. This activity may be referred to as a linear combination. Finally, an activation function controls the amplitude of the output. For example, an acceptable range of output is usually between 0 and 1, or it could be −1 and 1.

These artificial networks may be used for predictive modeling, adaptive control, and applications where they can be trained via a dataset. Self-learning resulting from experience then occurs within networks, which can derive conclusions from a complex and seemingly unrelated set of information. Neural networks function as non-linear statistical data modeling or decision making tools that can be used to model complex relationships between inputs and outputs or to find patterns in data. ANN models can be used to infer a function from observations and also to use the function. Learning in neural networks is particularly useful in applications where the complexity of the data or task makes the design of such functions by hand impractical[1]

[1] Neural Network. 20 Oct. 2020. Retrieved 30 Nov. 2020. https://en.wikipeidia.org/wiki/Neural_Network The ANN of the present Method and Arrangement for Predicting EONOx using a. Neural Network was created and trained based on dynamometer data from a Navistar A26 heavy duty engine, which is a 12.4 liter heavy duty diesel engine equipped with VGT, EGR, and Charge Air Cooling (CAC). Along with information from various engine sensors and actuators, dynamometer bench measurements were used as a reference point, or in other words as true values, to train the ANN. Similarly, validation and verification of the ANN were performed with Navistar A26 heavy duty engine dynamometer data. The specifications of this engine are shown in the Table 1.

TABLE 1

| Engine Specifications | |
| --- | --- |
| Make & Model | Navistar International A26 |
| Engine Type | Diesel |
| Stroke | 4 |
| Configuration | In-Line 6 Cylinder |
| Bore | 126 mm |
| Piston Stroke | 166 mm |
| Compression Ratio | 18.5:1 |
| Maximum Power | 500 hp (1700 rpm) |
| Maximum Speed | 2200 rpm |
| Idle Speed | 590 rpm |
| Engine Displacement | 12.42 L |
| Engine Weight | 1043 Kg |
| Fuel Injection Type | High Pressure Common Rail |

The Method and Arrangement for Predicting EONOx using a Neural Network presented herein may in a non-limiting embodiment include four elements or steps. The first step in the method may be to conduct certain tests on the target engine and collect the data. The second step in the method may be to analyze the acquired data and select the input variables that influence or relate to EONOx. The third step may be pre-processing the data, which involves normalizing and splitting the data into training and testing sets. The fourth step may be training and quantitative assessment of various candidate ANN architectures and finding the best ANN architecture. For this purpose, the Matlab® Neural Network toolbox and its functions may be used. MATLAB® is available from MathWorks® located at 1 Apple Hill Drive Natick, MA 01760. The optimal ANN architecture may then be developed by an automated ANN architecture selection algorithm. Each step in the method and arrangement is explained hereinafter.

Generating Training Data Set

Under the first step of one non-limiting exemplary embodiment of the Method and Arrangement for Predicting EONOx using a Neural Network, the data used to develop the intelligent EONOx prediction system may be collected from the engine dynamometer under various operation conditions of the previously identified target engine. The intelligent EONOx prediction system may then be trained and the optimal architecture may be developed based on the ANN selection algorithm. Using this method, the optimal ANN architecture may be able to predict EONOx with a significantly improved mean testing prediction accuracy. This trained ANN may then be deployed into the engine controller, for non-limiting example into an Engine Control Unit (ECU) or into an Engine Control Module (ECM), as a Simulink® block, and may then be used to predict EONOx instead of, or in conjunction with, the EONOx sensor. It is to be understood that any reference to an engine controller contained herein refers to any device or combination of devices for controlling at least a part of the operation of an engine, whether connected to the engine directly or indirectly.

When using machine learning algorithms, a large amount of data is required to train the computer to learn a given task. The data set used to develop the ANN of the intelligent EONOx prediction system of one non-limiting exemplary embodiment of the present Method and Arrangement for Predicting EONOx using a Neural Network may be generated by conducting various tests on the target engine using a dynamometer, as noted previously. Each data sample generation experiment may or may not be carried out on a dynamometer test cell under ambient steady state and/or non-steady state conditions. Along with information from certain engine sensors and actuators, a dynamometer bench measurement of EONOx may be used as a reference point, or true value, to train the ANN of the intelligent EONOx prediction system. Similarly, validation and verification may be performed with the target engine dynamometer data.

Generally, ANNs are very effective hi interpolating within a range of training data, but they should not be expected to extrapolate beyond that range. The data collection plan of one non-limiting exemplary embodiment of the present Method and Arrangement for Predicting EONOx using a Neural Network, therefore, may be designed in such a way as to cover the entire normal operating range of the target engine. More specifically, a series of tests may be conducted on the target engine using an eddy current dynamometer test cell, wherein certain inputs are varied systematically over the allowed ranges. All respective engine performance and emission parameters may be collected from engine controller signals.

Data Analysis

Under the second step of one non-limiting exemplary embodiment of the Method and Arrangement for Predicting EONOx using a Neural Network, the steady state and/or non-steady state tests conducted for each combination of inputs, may result in numerous combinations of engine parameters. It is understood that a larger or smaller number of target and input variables may be used in embodiments of the Method and Arrangement for Predicating EONOx using a Neural Network, resulting in more or less combinations of engine and exhaust system parameters. The selection of an appropriate set of variables as inputs for the ANN of the intelligent EONOx prediction system is therefore an important step, as the performance of the intelligent EONOx prediction system is dependent on its input variables. An object of the data analysis step, then, may be to select the relevant input variables that influences EONOx.

Multiple input variables including various engine sensors and actuators may be identified as affecting the EONOx of the target engine, and may be obtained from their respective engine controller signals and/or dynamometer signals from the collected data. Again, it is understood that a larger or smaller number of input variables may be identified in embodiments of the intelligent EONOx prediction system while remaining within the scope of this disclosure. Further, in order to check whether there are any redundant variables in the selected input variables, a Pearson correlation test may be performed to check the correlation between each variable and the EONOx. The Pearson correlation coefficient is a statistic that measures linear correlation between two variables X and Y. It has a value between +1 and −1, with a value of +1 being a total positive linear correlation, a value of 0 being no linear correlation, and a value of −1 being a total negative linear correlation.[2] Even though certain variables may be non-linearly related to the EONOx, the Pearson correlation test may show that each has some sort of correlation with EONOx.

[2] Pearson correlation coefficient. 28 Nov. 2020. Retrieved 1 Dec. 2020. https://en.wikipedia.org/wiki/Pearson_correlation_coefficient The list below presents the network inputs which were tried in different combinations.

Engine Speed
Indicated Engine Torque
Fuel Quantity
EGR Position
VGT Position
Exhaust Mass Flow
Exhaust Manifold Pressure
Exhaust Manifold Temperature
intake Manifold Pressure
Intake Manifold Temperature
Coolant Temperature
Oxygen Concentration in Exhaust
Injection Timing
Fresh Air Oxygen Mass Flow
Rate of Change of Indicated Engine Torque

Pre-Processing the Data

Under the third step of the present exemplary embodiment of the Method and Arrangement for Predicting EONOx using a Neural Network, the data may be pre-processed as part of the process in order to assist the ANN in learning the data patterns. Since the intelligent EONOx prediction system may be developed with multiple input variables, the input variables might not be fed into the ANN in raw form. Specifically, the range of values of each input variable to be optimized may be initially broad, and may be optimized. Since the data range of input variable values as raw data may vary widely, the objective functions in the machine learning algorithms may not work properly without normalization. In the data normalization pre-processing step of the Method and Arrangement for Predicting EONOx using a Neural Network, therefore, all of the input and output variables may be brought into same range of [−1, −1] to [1, 1], for example [0, 1] or [−1, 1]. In the Method and Arrangement for Predicting EONOx using a Neural Network, the data may be normalized using the following equation:

$$norm_{x_i} = \frac{x_i - \min(x_i)}{\max(x_i) - \min(x_i)}, i = 1, \ldots, k$$

where $normx_i$ is a normalized vector for the input feature, $x_i$, $x_i$ is the $i^{th}$ input feature vector, $\max(x_i)$ is the maximum in $x_i$, $\min(x_i)$ is the minimum in $x_i$, and k is the total number of input variables hi the intelligent EONOx prediction system.

Automated Neural Network Selection Algorithm

As noted previously, the fourth step of the Method and Arrangement for Predicting EONOx using a Neural Network is training various neural network architectures and finding the best architecture, which optimal neural network architecture may be developed by an automated neural-network architecture selection algorithm. Generally, to create an ANN, certain properties of the network may be considered, such as the input variables, the number of hidden layers, the number of hidden neurons, the number of neurons in the output layer, the learning algorithm, and the activation function. In the present exemplary embodiment of the intelligent EONOx prediction system of the Method and Arrangement for Predicting EONOx using a Neural Network, multiple input variables were selected and the output variable is the EONOx value, although it is again contemplated that more or less input variables than those listed may be utilized. For network optimization, Levenberg-Marquardt algorithm may be used for training and the Tangent Sigmoid may be used as a transfer activation function for the hidden layer output. The ANN may utilize a gradient descent (also known as backpropagation) algorithm to learn its weights and biases while looking for the minimum error function.

The Levenberg-Marquardt algorithm, also known as the damped least-squares method, is generally used to solve non-linear least squares problems. Specifically, the Levenberg-Marquardt algorithm is used in software applications for solving generic curve-fitting problems. The Levenberg-Marquardt algorithm finds only a local minimum, which may not necessarily be the global minimum. The Levenberg-Marquardt algorithm interpolates between the Gauss-Newton algorithm and the method of gradient descent. The Levenberg-Marquardt algorithm is more robust than the Gauss-Newton algorithm, which means that in many cases it finds a solution even if it starts very far off the final minimum.[3]

[3] Levenberg-Marquardt algorithm 27 Aug. 2020. Retrieved 1 Dec. 2020. https://en.wikipedia.org/wiki/Levenber-Marquardt_algorithm Generally, when determining the number of neurons in the hidden layers and the number of hidden layers in an ANN, trial and error is used to get the best solution, which is the best architecture with least Root Mean Squared Error (RMSE). In at least one non-limiting exemplary embodiment of the intelligent EONOx prediction system of the Method and Arrangement for Predicting EONOx using a Neural Network of the present disclosure, in order to provide the optimal ANN, an algorithm may again be used to select the optimal ANN architecture based on the use of RMSE analysis to train a number of ANNs with random numbers of hidden layers and neurons. This automated procedure is depicted in FIG. 1, which is a schematic representation of an automated neural network training and selection algorithm of a non-limiting exemplary embodiment of the Method and Arrangement for Predicting EONOx using a Neural Network of the present disclosure.

In the intelligent EONOx prediction system 10 shown in FIG. 1, the tests on the target engine and collection of data therefrom is performed at 12, and the analysis of the acquired data and selection of input variables is performed at 14. The third step 16 is pre-processing the data, which involves normalizing and splitting the data into training and testing sets. Training the various ANN architectures and finding the best ANN architecture starts at 18, wherein the automated ANN architecture development and/or selection algorithm 20 is triggered after pre-processing of the data. From a given range of numbers of hidden layers and hidden neurons, all possible combinations of ANNs may be generated. Next, each of the ANNs from the generated combinations may again be trained with the Levenberg-Marquardt algorithm at 22. For each candidate ANN architecture the performance of the architecture is evaluated at 24 by calculating the Root Mean Square Error (RMSE) using the testing data samples with RMSE being selected as the performance metric.

The RMSE calculated using the current ANN architecture is then compared at 26 with the optimal ANNs' RMSEs thus far. During the first iteration, the initial ANN may be assigned as the optimal network. If during a subsequent iteration, the RMSE of the ANN being evaluated is less than the previously optimal ANN, then the ANN being evaluated is selected as the optimal ANN. If the RMSE of the ANN being evaluated is greater than the previously optimal ANN, then the previously optimal ANN remains the optimal ANN, and the Ann being evaluated is discarded. Accordingly, the best ANN architecture status is updated. This procedure is repeated at 28 until all the generated ANN combinations are computed. Finally, the optimal ANN with the minimum RMSE, i.e.—having the optimum level of complexity in terms of levels of layers and neurons, is output at 30.

Results

Figure 2:
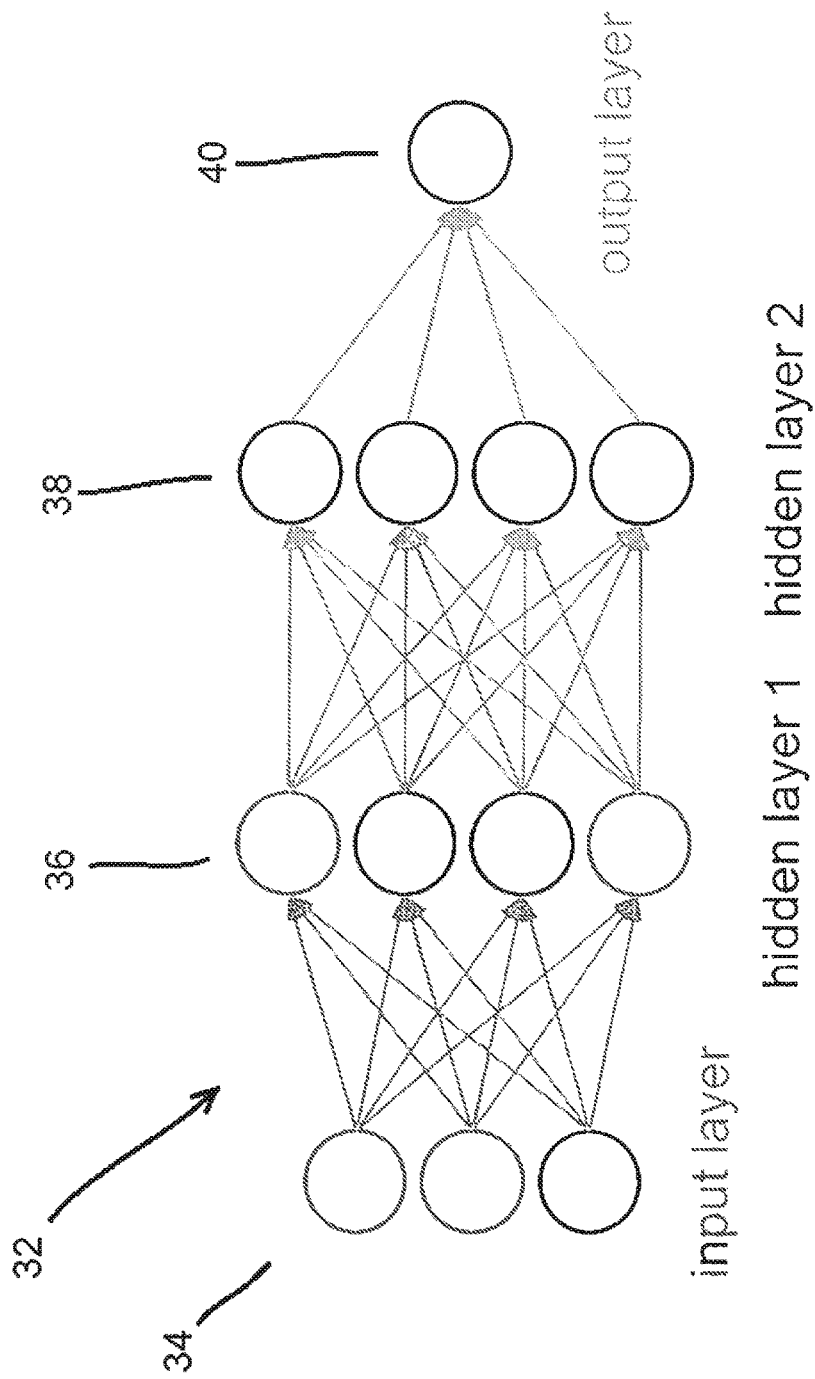
FIG. 2 is a graphic representation of an Artificial Neural Network of an embodiment of the Method and Arrangement for Predicting EONOx using a Neural Network of the present disclosure, as described herein.

Whether or not the aforementioned algorithm is employed, various ANN configurations having different numbers of layers and neurons may be trained in order to obtain a minimum RMSE, i.e.—having the best correlation between predicted value versus true reference value. FIG. 2 shows a non-limiting exemplary ANN architecture 32 that may result from the aforementioned algorithm. The non-limiting exemplary ANN architecture 32 has an input layer 34, a first hidden layer 36 having four neurons, a second hidden layer 38 having four neurons, and an output layer 40. Training, testing, and validation may be conducted using the Ramped Mode Cycles (RMC) method or the Federal Test Procedure (FTP) method. The developed intelligent EONOx prediction system of the present non-limiting exemplary embodiment of the Method and Arrangement for Predicting EONOx using a Neural Network was then applied to the data points that were not used for training.

Training, Testing, Validation, and Combined Results

Figure 3:
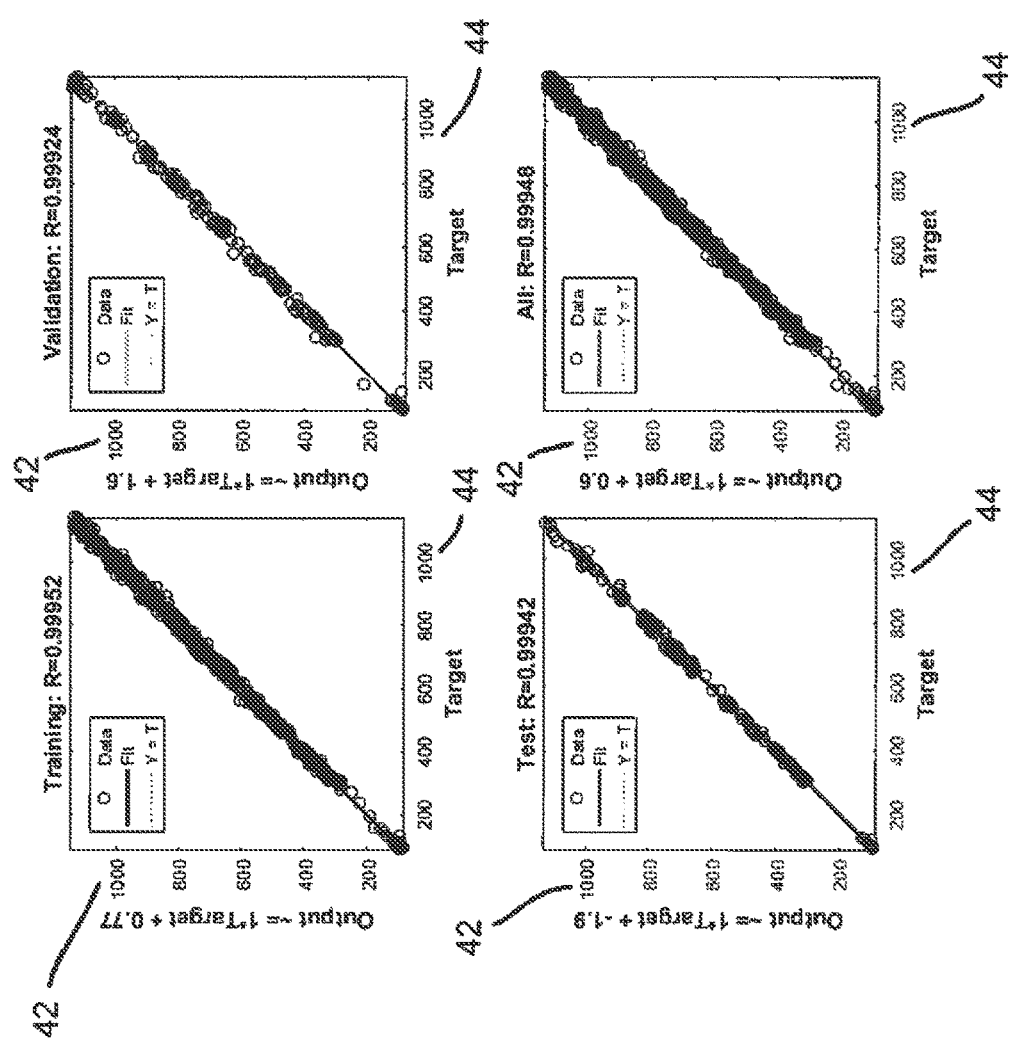
FIGS. 3, 6, and 9 are sets of charts showing EONOx prediction simulation training, test, and validation results of embodiments of the Method and Arrangement for Predicting EONOx using a Neural Network of the present disclosure, as described herein.
Figure 6:
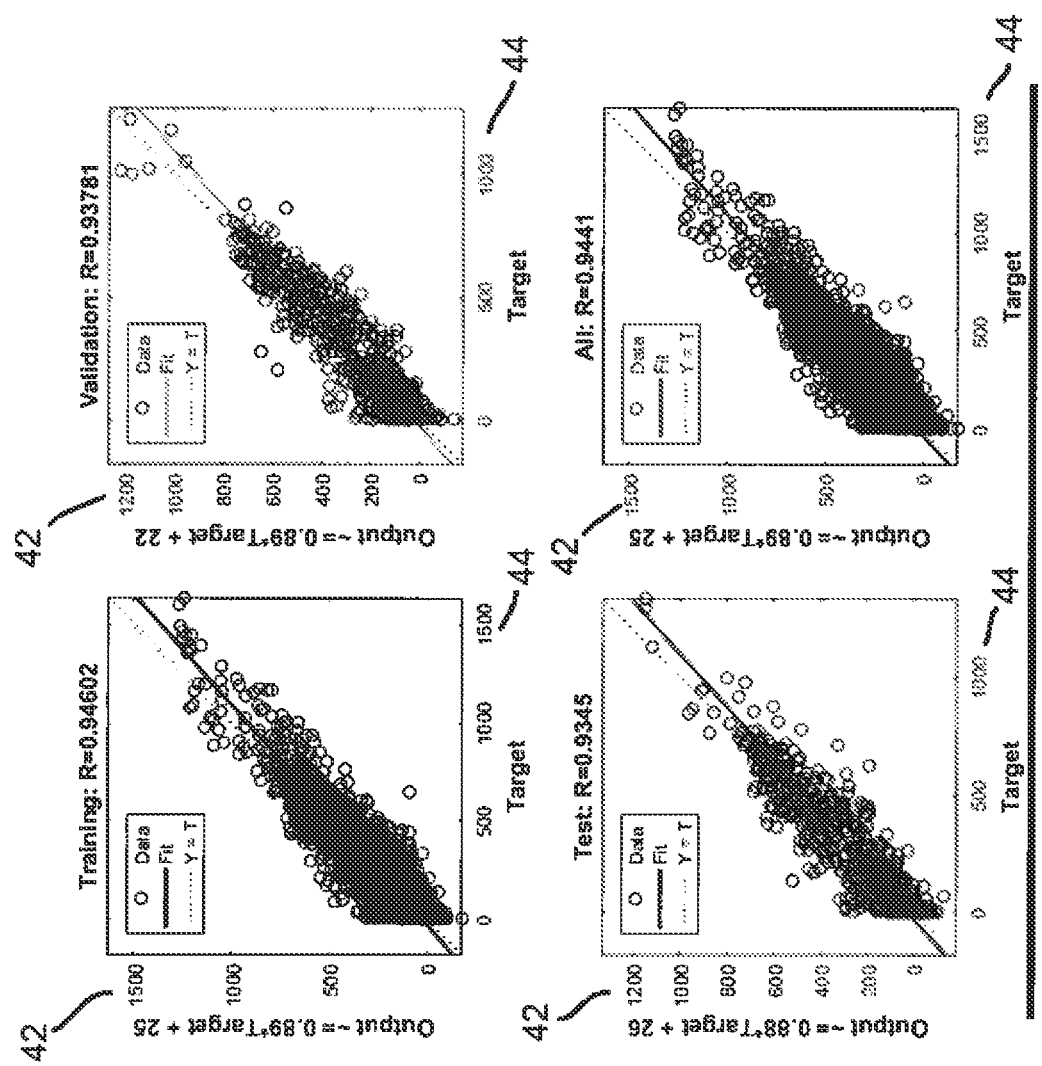
Figure 9:
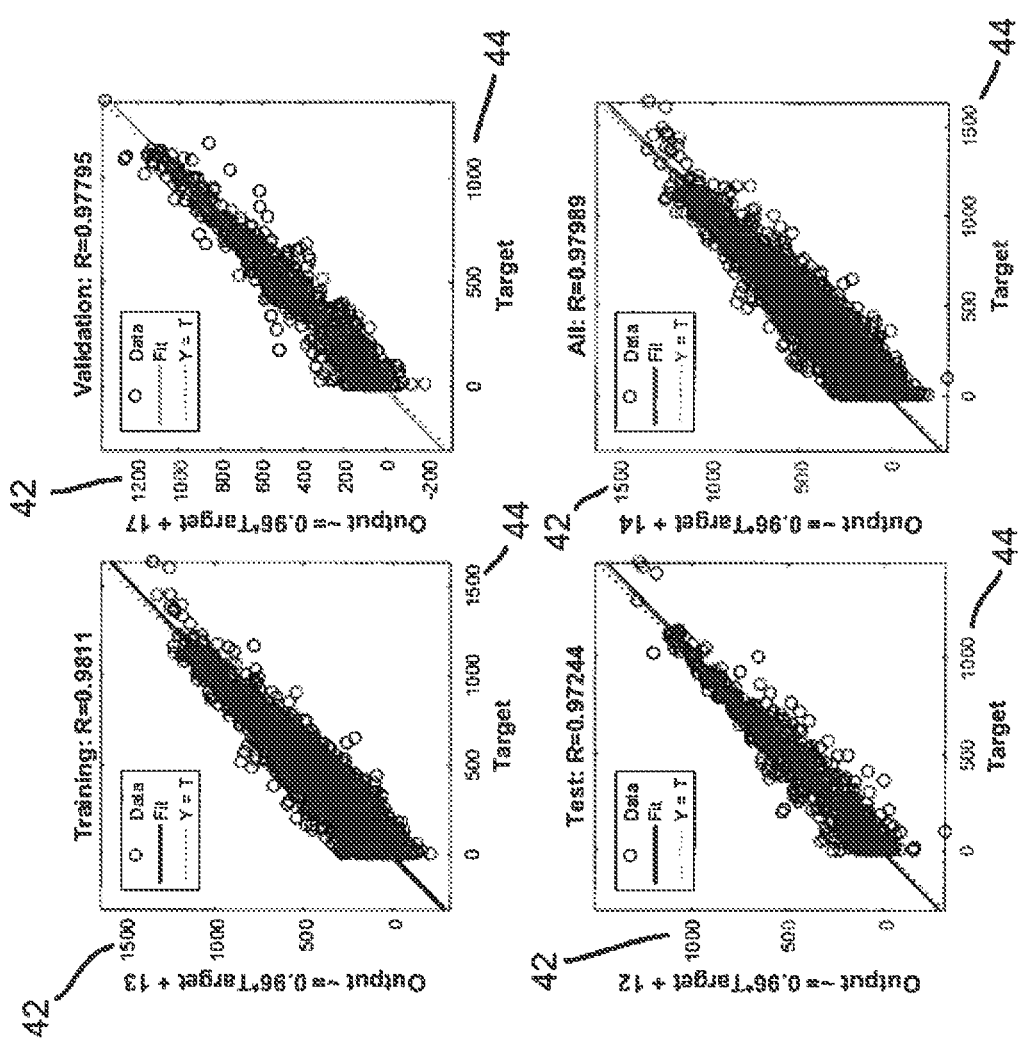

FIGS. 3, 6, and 9 show training, testing, validation, and combined EONOx prediction simulation results of the intelligent EONOx prediction system of an embodiment of the Method and Arrangement for Predicting EONOx using a Neural Network using the RMC method, the FTP method, and mixed RMC and FTP methods, respectively. Specifically, the predicted EONOx values 42 from the intelligent EONOx prediction system are plotted against the actual EONOx values 44 in FIGS. 5, 6, and 9. Simulation results of the intelligent EONOx prediction system during training are shown in the upper left charts. Simulation results of the intelligent EONOx prediction system during testing are shown in the lower left charts. Simulation results of the intelligent EONOx prediction system during validation are shown in the upper right charts. Combined simulation results of the intelligent EONOx prediction system are shown in the lower right charts.

Figures 4, 5:
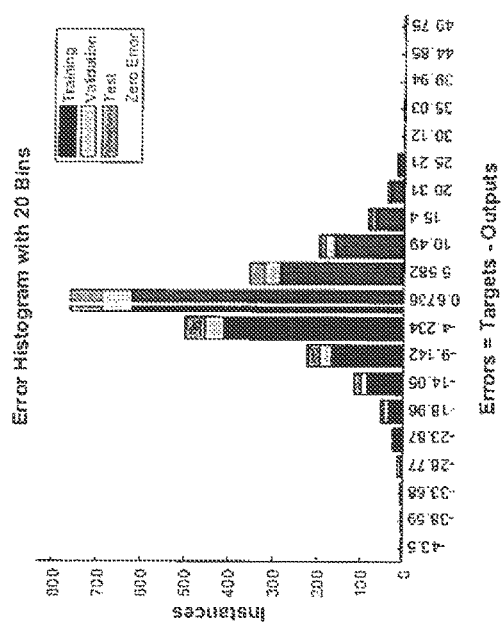
FIGS. 4, 7, and 10 are error histograms of embodiments of the Method and Arrangement for Predicting EONOx using a Neural Network of the present disclosure, as described herein.
FIGS. 5, 8, and 11 are charts showing actual versus predicted EONOx of embodiments of the Method and Arrangement for Predicting EONOx using a Neural Network of the present disclosure, as described herein.

The correlation factor in each of FIGS. 3, 6, and 9 is calculated based on RMSE. As shown in FIG. 3, the correlation factor value in each instance is at least 99.9% for the RMC method, with RMSE being less than 0.1%. As shown in FIG. 5, the correlation factor is around 89%, with RMSE being around 11% for the FTP method. However, the training and validation regression factor for the FTP method is around 93%. As shown in FIG. 9, the correlation factor is around 96%, with RMSE being around 4% for a mix of RMC and FTP methods. However, the training and validation regression factor for the mix of RMC and FTP methods is around 98%.

Figure 7:
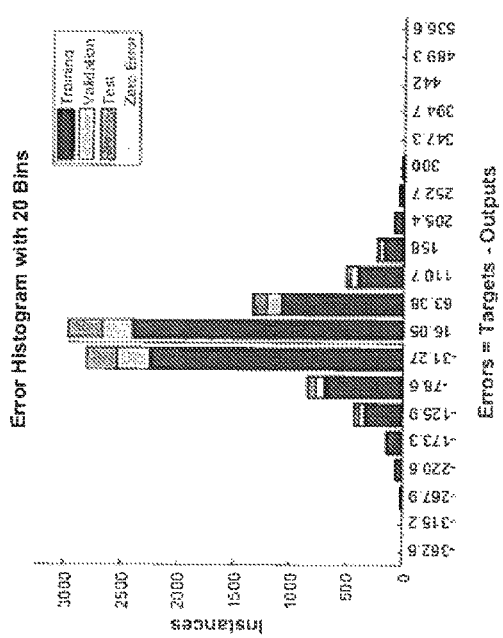
Figure 8:
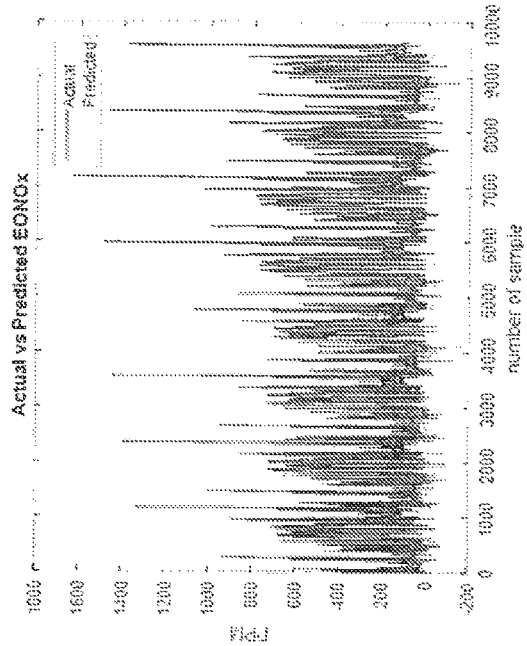
Figure 10:
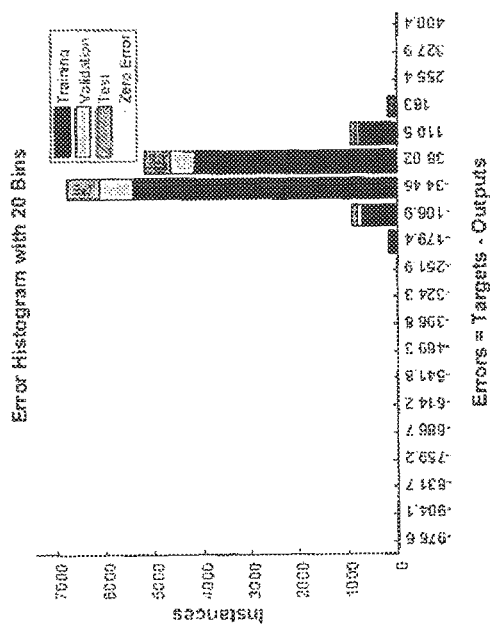
Figure 11:
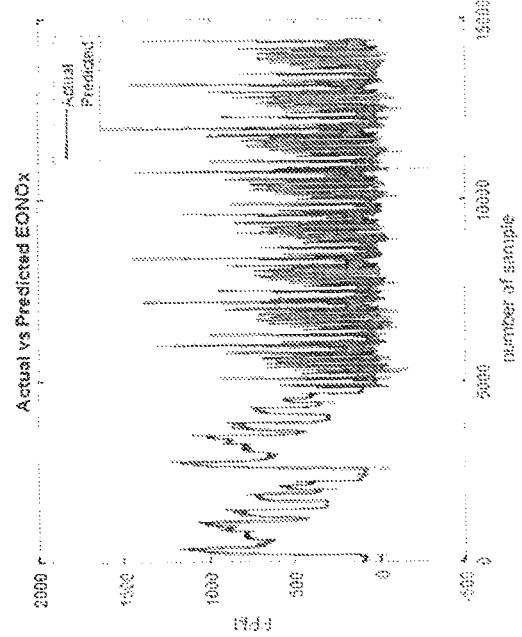

FIGS. 4, 7, and 10 show results error histograms for training, validation, and testing of the intelligent EONOx prediction system of an embodiment of the Method and Arrangement for Predicting EONOx using a Neural Network using the RMC method, the FTP method, and mixed RMC and FTP methods, respectively. FIGS. 5, 8, and 11 show actual versus predicted EONOx for the intelligent EONOx prediction system of an embodiment of the Method and Arrangement for Predicting EONOx using a Neural Network using the RMC method, the FTP method, and mixed RMC and FTP methods, respectively. As shown in FIGS. 3 through 11, the developed intelligent EONOx prediction system predicted EONOx values demonstrate excellent agreement with the actual EONOx values. It follows that the intelligent EONOx prediction system of the present Method and Arrangement for Predicting EONOx using a Neural Network can be used to predict EONOx of the target Navistar A26 12.42 L Diesel Engine with VGT, EGR, and CAC, as a non-limiting example.

Deployment

Once the optimal ANN is determined, the trained intelligent EONOx prediction system of the Method and Arrangement for Predicting EONOx using a Neural Network of the present disclosure can be deployed into the controller of an engine, for non-limiting example into an ECU or into an ECM, for in-vehicle testing as a Simulink® Block. Simulink® is a MATLAB®-based graphical programming environment for modeling, simulating, and analyzing multi-domain dynamic systems. Its primary interface is a graphical block diagramming tool and a customizable set of block libraries. It integrates with the MATLAB® environment and can either drive MATLAB® or be scripted from it. Simulink® is used in automatic control and digital signal processing for multi-domain simulation and model-based design.[4] Simulink® and MATLAB® are available from MathWorks® located at 1 Apple Hill Drive Natick, MA 01760. A Simulink® block of the intelligent EONOx prediction system may thereby be created.

[4] Simulink. 12 Nov. 2020. Retrieved 2 Dec. 2020. https://en.wikipedia.org/wiki/Simulink The Simulink® block reads signals from various sensors and actuators, as listed previously, fed to it by way of the engine controller. This Simulink® block may be integrated with the engine controller using a Rapid Prototyping System such as dSpace, available from dSPACE Inc., 50131 Pontiac Trail, Wixom, MI, USA 48393, and can be tested online. The next step may include generating software code in an AUTOSAR code generation environment and flashing it to the engine controller. AUTomotive Open System ARchitecture (AUTOSAR) is a global development partnership of automotive interested parties that creates and establishes an open and standardized software architecture for engine controllers.[5]

[6] AUTOSAR. 27 Oct. 2020. Retrieved 2 Dec. 2020. https://en.wikipedia.org/wiki/AUTOSAR The following references are hereby incorporated by reference in their entirety: Deng, Jiamei, Stobart, Richard, and Maass Basti. "The Applications of Artificial Neural Networks to Engines." Artificial Neural Networks—Industrial and Control Engineering Applications, April 2011. https://doi.org/10.5772/15783.

While the Method and Arrangement for Predicting EONOx using a Neural Network has been described with respect to at least one embodiment, the Method and Arrangement for Predicting EONOx using a Neural Network can be further modified within the spirit and scope of this disclosure, as demonstrated previously. This application is therefore intended to cover any variations, uses, or adaptations of the Method and Arrangement for Predicting EONOx using a Neural Network using its general principles. Further, this application is intended to cover such departures from the present disclosure as come within known or customary practice in the art to which the disclosure pertains and which fall within the limits of the appended claims.

What is claimed is:

1. An Arrangement for Estimating or Predicting Engine Out Exhaust gases, comprising:
an engine having an engine controller and an exhaust gas sensor;
an Artificial Neural Network (ANN) deployed into the engine controller to provide an exhaust gas output variable and having an ANN architecture selected from multiple candidate ANN architectures, each of the multiple candidate ANN architectures being trained using a training set of data, the selected ANN architecture being selected by way of an automated ANN architecture selection algorithm using a testing set of data;
the training set of data and the testing set of data comprising at least one input variable from at least one of an engine sensor and an actuator that affects or is affected by the engine out exhaust gas; and
the training set of data and the testing set of data being acquired from testing a target engine and pre-processing a body of data acquired therefrom, the pre-processing comprising splitting the body of data into the training set of data and the testing set of data.

2. The Arrangement of claim 1, wherein:
the engine controller being configured to use the exhaust gas output variable:
instead of a signal provided by the exhaust gas sensor, in conjunction with the signal provided by the exhaust gas sensor, or
selectively instead of and in conjunction with the signal provided by the exhaust gas sensor.

3. The Arrangement of claim 1, wherein:
the exhaust gas is Nitrogen Oxides, the exhaust gas sensor is an Engine Out Nitrogen Oxides (EONOx) sensor, and the exhaust gas output variable is an EONOx output variable.

4. The Arrangement of claim 1, wherein:
the training set of data and the testing set of data further comprising at least one input variable from a dynamometer arrangement, wherein testing the target engine comprises systematically varying engine operating conditions over a normal operating range of the engine.

5. The Arrangement of claim 4, wherein:

pre-processing the body of data further comprises normalizing the data.

6. The Arrangement of claim 5, wherein:
the automated ANN architecture algorithm being triggered after pre-processing the body of data;
the automated ANN architecture algorithm generating all possible combinations of ANNs from a number of hidden layers and hidden neurons;
the automated ANN architecture algorithm training each of the possible combinations of ANNs by way of a Levenberg-Marquardt algorithm; and
the automated ANN architecture algorithm selecting the optimal ANN architecture based on Root Mean Squared Error (RMSE) analysis using the training set of data.

7. The Arrangement of claim 6, wherein:
pre-processing the body of data further comprises performing a Pearson correlation test upon at least one of:
the at least one input variable from at least one of the engine sensor and the actuator, and
the at least one input variable from the dynamometer arrangement, and
checking thereby the correlation between each input variable and engine out exhaust gas output.

8. The Arrangement of claim 6, wherein:
the training set of data further comprising at least one dynamometer bench measurement of EONOx used as a reference point or true value.

9. The Arrangement of claim 8, wherein:
the input variables from at least one of engine sensors and actuators that affect or are affected by EONOx are selected from a group consisting of:
engine speed,
indicated engine brake torque,
quantity of fuel injected,
EGR valve position,
VGT actuator position,
exhaust mass flow,
exhaust manifold absolute pressure,
intake manifold absolute pressure,
intake manifold temperature,
engine coolant temperature,
oxygen concentration in exhaust,
injection timing,
fresh air oxygen mass flow, and
rate of change of indicated engine torque.

10. The Arrangement of claim 6, wherein:
the automated ANN architecture algorithm using a Tangent Sigmoid as a transfer activation function for a hidden layer output.

11. A Method of Estimating or Predicting Engine Out Exhaust gases, comprising the steps of:
providing an engine with an engine controller and an exhaust gas sensor;
training multiple candidate Artificial Neural Network (ANN) architectures using a training set of data;
selecting an ANN architecture from the multiple candidate ANN architectures by way of an automated ANN architecture selection algorithm using a testing set of data wherein;
the training set of data and the testing set of data comprising at least one input variable from at least one of an engine sensor and an actuator that affects or is affected by the engine out exhaust gases; and
the training set of data and the testing set of data being acquired by testing a target engine and pre-processing a body of data acquired therefrom, pre-processing the body of data comprising splitting the body of data into the training set of data and the testing set of data;
providing an exhaust gas output variable using the selected ANN architecture; and
deploying the selected ANN architecture into the engine controller.

12. The Method of claim 11, further comprising the steps of:
configuring the engine controller to use the exhaust gas output variable:
instead of a signal provided by the exhaust gas sensor, in conjunction with the signal provided by the exhaust gas sensor, or
selectively instead of and in conjunction with the signal provided by the exhaust gas sensor.

13. The Method of claim 11, wherein:
the exhaust gas is Nitrogen Oxides, the exhaust gas sensor is an EONOx sensor, and the exhaust gas output variable is an EONOx output variable.

14. The Method of claim 11, wherein:
the training set of data and the testing set of data further comprising at least one input variable from a dynamometer arrangement; and
testing the target engine comprises systematically varying engine operating conditions over a normal operating range of the engine.

15. The Method of claim 14, wherein:
pre-processing the body of data further comprises normalizing the data.

16. The Method of claim 15, further comprising:
triggering the automated ANN architecture algorithm after pre-processing the body of data;
generating all possible combinations of ANNs from a number of hidden layers and hidden neurons using the automated ANN architecture algorithm;
training each of the possible combinations of ANNs by way of a Levenberg-Marquardt algorithm using the automated ANN architecture algorithm; and
selecting the optimal ANN architecture based on Root Mean Squared Error (RMSE) analysis using the automated ANN architecture algorithm and the training set of data.

17. The Method of claim 16, wherein:
pre-processing the body of data further comprises performing a Pearson correlation test upon the at least one input variable from at least one of the engine sensor and the actuator, and the at least one input variable from the dynamometer arrangement, and checking thereby the correlation between each input variable and engine out exhaust gas output.

18. The Method of claim 16, wherein:
the training set of data further comprises a dynamometer bench measurement of EONOx used as a reference point or true value.

19. The Method of claim 18, wherein:
the input variables from at least one of engine sensors and actuators that affect or are affected by EONOx are selected from a group consisting of:
engine speed,
indicated engine brake torque,
quantity of fuel injected,
EGR valve position,
VGT actuator position,
exhaust mass flow,
exhaust manifold absolute pressure,
intake manifold absolute pressure,
intake manifold temperature, engine coolant temperature,
oxygen concentration in exhaust,
injection timing,
fresh air oxygen mass flow, and
rate of change of indicated engine torque.

20. The Method of claim 16, wherein:
the automated ANN architecture algorithm uses a Tangent Sigmoid as a transfer activation function for a hidden layer output.

* * * * *